US008090933B2

(12) United States Patent
Busaba et al.

(10) Patent No.: US 8,090,933 B2
(45) Date of Patent: Jan. 3, 2012

(54) METHODS COMPUTER PROGRAM PRODUCTS AND SYSTEMS FOR UNIFYING PROGRAM EVENT RECORDING FOR BRANCHES AND STORES IN THE SAME DATAFLOW

(75) Inventors: Fadi Y. Busaba, Poughkeepsie, NY (US); Bruce C. Giamei, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 12/029,696

(22) Filed: Feb. 12, 2008

(65) Prior Publication Data

US 2009/0204794 A1 Aug. 13, 2009

(51) Int. Cl.
*G06F 7/38* (2006.01)
*G06F 9/00* (2006.01)
*G06F 9/44* (2006.01)

(52) U.S. Cl. .......................... 712/227; 712/220; 712/225

(58) Field of Classification Search .................. 712/227
See application file for complete search history.

(56) References Cited

U.S. PATENT DOCUMENTS 4,409,654 A * 10/1983 Wada et al. ................... 711/213
4,641,277 A * 2/1987 Yata et al. ..................... 711/207
5,345,567 A 9/1994 Hayden et al.
5,440,504 A 8/1995 Ishikawa et al.
5,517,628 A 5/1996 Morrison et al.
5,621,909 A 4/1997 Webb et al.
5,964,893 A * 10/1999 Circello et al. ................ 714/39

OTHER PUBLICATIONS

International Business Machines Corporation (IBM), z/Architecture Principles of Operation, Sixth Edition (Apr. 2007), 1216 pages(split into 4 parts).

* cited by examiner

*Primary Examiner* — Eddie P Chan
*Assistant Examiner* — George Giroux
(74) *Attorney, Agent, or Firm* — Cantor Colburn LLP; John Campbell

(57) ABSTRACT

The present invention relates to a method for the unification of PER branch and PER store operations within the same dataflow. The method comprises determining a PER range, the PER range comprising a storage area defined by a designated storage starting area and a designated storage ending area, wherein the storage starting area is designated by a value of the contents of a first control register and the storage ending area is designated by a value of the contents of a second control register. The method also comprises retrieving register field content values that are stored at a plurality of registers, wherein the retrieved content values comprises a length field content value, and setting the length field content value to zero for a PER branch instruction, thereby enabling a PER branch instruction to performed similarly to a PER storage instruction.

16 Claims, 3 Drawing Sheets

DETERMINE PER RANGE — 305
SET LENGTH FIELD CONTENT VALUE TO ZERO — 310
RETRIEVE REGISTER CONTENT VALUES — 315
DETERMINE BRANCH TARGET/START ADDRESS — 320
DETERMINE END ADDRESS — 325
DETERMINE IF BRANCH TARGET IS W/I PER RANGE — 330

METHODS COMPUTER PROGRAM PRODUCTS AND SYSTEMS FOR UNIFYING PROGRAM EVENT RECORDING FOR BRANCHES AND STORES IN THE SAME DATAFLOW

BACKGROUND OF THE INVENTION

This invention relates generally to a program event recording program debugging tool, and more particularly to utilizing a single hardware feature for the checking of PER branch instructions and PER store instructions within a common dataflow configuration.

Program event recording (PER) is a program debugging tool that is implemented in conjunction with IBM's® z/architecture® mainframe computing systems. In operation, PER identifies the occurrence of the execution of a successful branch instruction, wherein PER provides the option of requiring that an event occur only when a branch-target location is within a designated storage area (a PER branch instruction). PER also provides for the fetching of a designated instruction from a predetermined storage area (a PER fetch instruction) in addition to allowing for the contents of the designated storage area to be stored at a designated storage area (PER store instruction). PER event information is provided to a program by means of a program interruption, wherein the cause of the interruption is identified in the interruption code.

Within a PER environment, a designated storage area is identified by two control registers, wherein a first register indicates the start of the storage area and a secondary register indicates the end of the designated storage area. The designated storage area specified by the first and secondary registers is referred to as the PER range. Presently PER branch and store instructions are executed within differing hardware dataflow configurations.

It would be advantageous to be able to unify the hardware dataflow operations within a single hardware feature in regard to PER Branch and Store instructions.

BRIEF SUMMARY OF THE INVENTION

An exemplary embodiment includes a method for the unification of PER branch and PER store operations within the same dataflow. The method comprises determining a PER range, the PER range comprising a storage area defined by a designated storage starting area and a designated storage ending area, wherein the storage starting area is designated by a value of the contents of a first control register and the storage ending area is designated by a value of the contents of a second control register. The method also comprises retrieving register field content values that are stored at a plurality of registers, wherein the retrieved content values comprises a length field content value, and setting the length field content value to zero for a PER branch instruction, thereby enabling a PER branch instruction to performed similarly to a PER storage instruction.

Another exemplary embodiment includes a computer program product that includes a computer readable medium useable by a processor. The medium having stored thereon a sequence of instructions which, when executed by the processor, causes the processor to unify PER branch and PER store operations within the same dataflow by determining a PER range, wherein the PER range comprises a storage area defined by a designated storage starting area and a designated storage ending area. The storage starting area is designated by a value of the contents of a first control register and the storage ending area is designated by a value of the contents of a second control register. Also comprised are register field content values that are stored at a plurality of registers, wherein the retrieved content values comprise a length field content value are retrieved and the length field content value is set to zero for a PER branch instruction.

A further exemplary embodiment includes system for the unification of PER branch and PER store operations within the same dataflow. The system comprises a plurality of registers, the registers being configured for the storage of a plurality of register field content values, the register field content values including a length field content value. The length field value is set to a value of zero for a PER branch instruction. Also comprised is a primary adder that is in communication with the plurality of registers, wherein the primary adder calculates a starting address or branch target address from predetermined register field content values that are retrieved from the plurality of registers. The system additionally comprises a secondary adder that is in communication with the plurality of registers, wherein the secondary adder calculates an ending address from predetermined register field content values that are retrieved from the plurality of registers, the predetermined register field content values including the length field content value.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 1:
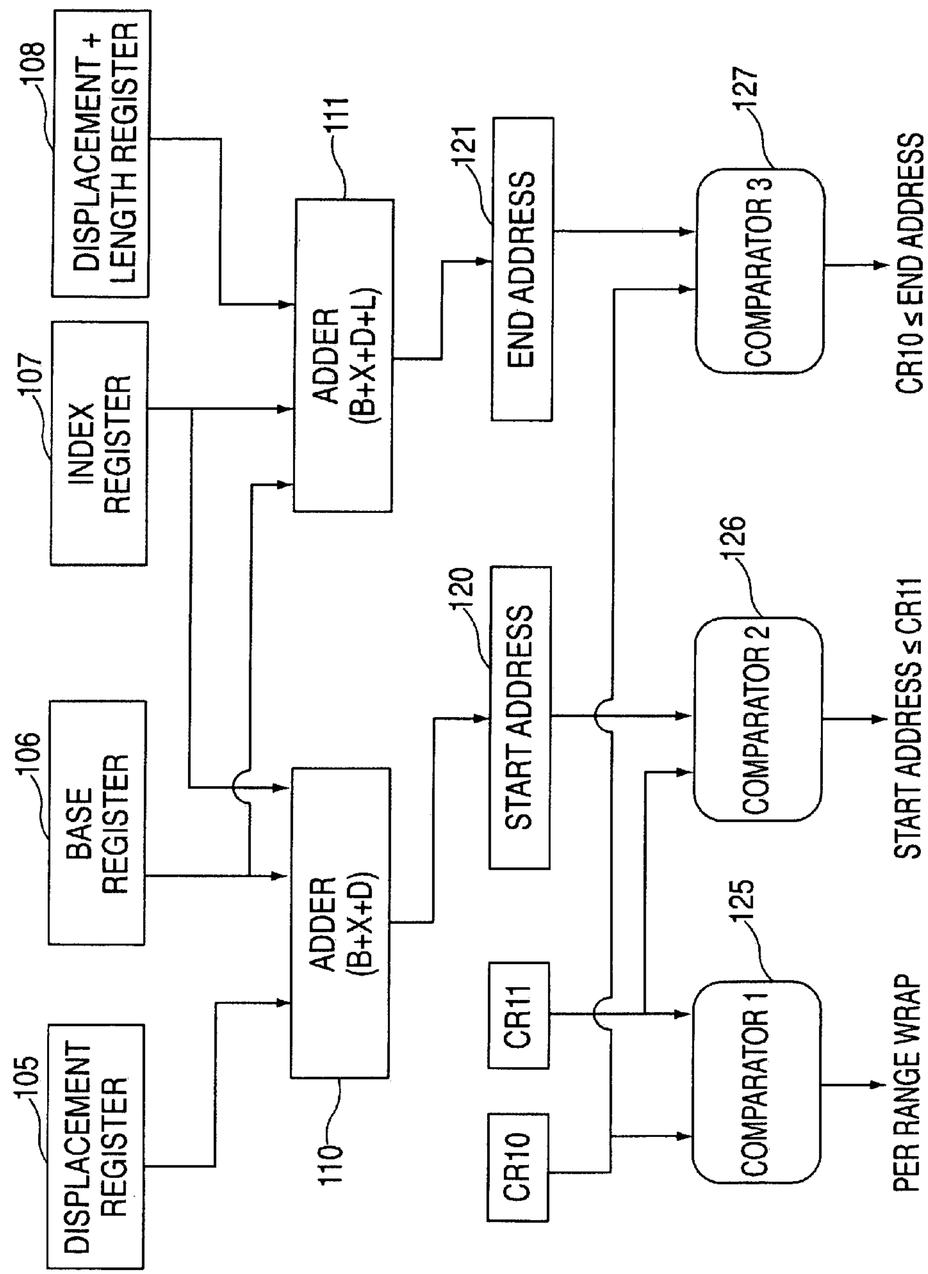
FIG. 1 is a diagram showing a system for the unification of PER branch and PER store operations within the same dataflow as in accordance with the exemplary embodiment of the present invention.

An exemplary embodiment of the invention is described below in detail. The disclosed embodiment is intended to be illustrative only since numerous modifications and variations therein will be apparent to those of ordinary skill in the art. Aspects of the exemplary embodiment of the present invention can be implemented within a conventional computing system environment comprising hardware and software elements.

IBM® z/architecture® mainframe computing systems employ a plurality of store instructions, the store instructions comprising variable degrees of length. In general, hardware executed store instructions comprise lengths within the range of 1 byte to 256 bytes. Within PER debugging operations, PER provides for a successful-branching event to occur only in the instance that a branch target is within a designated storage area. PER further provides for the occurrence of a storage-alteration event only in the instance that the storage area is within designated address spaces. The information necessitated for the control of PER instructions resides in a set off control registers (i.e., control registers 9, 10, and 11 within z/architecture®) and an address-space-control element. In regard to a PER starting address, the bits 0-63 of control register 10 comprise the address of the beginning of a designated storage area, as per a PER ending address, bits 0-63 of control register 11 comprise the address of the end of the designated storage area.

The exemplary embodiment of the present invention utilizes the same hardware dataflow that is implemented to check for PER store instructions for the checking of PER branch instructions. In function, within the exemplary embodiment, a PER branch instruction check is treated as a PER store instruction check for a storage field length of one byte. In order to determine a PER store event, the starting address and the ending address of the storage operand is compared to a PER range as defined by the range of the storage content values of control register 10 and control register 11. To determine if a PER store event has occurred in hardware, the starting address for the PER store operand is compared to the store content values of control register 11, and the ending address of the PER store operand is compared with the store content values of control register 10.

In order to determine if a PER branch event has occurred in hardware the branch target address must only be compared with the store content value of control register 10. Therefore, in order to utilize the same hardware to determine if a PER store event and PER branch event have occurred, the exemplary embodiment of the present invention defines a length field for a branch instruction and sets the length field register to a value of zero; thus forcing the start address for a PER branch target to be equal to an end address for the PER branch target. This operation can be performed since no length field is specified for a PER branch instruction, and therefore, functionally the length field is not needed. As such, a PER branch check is treated as a PER store check for the storage of one byte, thus for a store of one byte the starting address is forced to equal the ending address.

FIG. 1 shows a data flow for calculating a PER store and PER branch event. As shown, the dataflow comprises a displacement register 105 for holding a displacement store content value (D), a base register 106 for holding a base store content value (B), an index register 107 for holding an index store content value (X), and a displacement and length register 108 for holding displacement and length store content values (D+L). The dataflow further comprises two control registers, CR10 and CR11. The CR10 register holds the contents of control register 10, and the CR11 register holds the contents of control register 11.

The dataflow also comprises two adders 110, 111. Adder 110 is designated to add the store content values represented by B+X+D that are received from the base 106, displacement 105, and index 107 registers. The adder 111 is designated to add the store content values represented by B+X+D+L that are received from the base 106, index 107, and displacement and length 108 registers. Upon the completion of the operation of the adder 110 the start address register 120 receives the B+X+D store content values. Thus, the start address register 120 can hold either the operand address starting address for a store instruction or the branch target address for a branch instruction. Upon the completion of the operation of adder 111 the end address register 121 receives the B+X+D+L store content values; and therefore holds either the operand address ending address for a store instruction or the branch target address for a branch instruction. As noted above, the ending address is not functionally needed for branch instructions and thus is utilized in this method to hold the branch target address in order to have a common dataflow PER determination. By forcing the length field content value to zero for a PER branch event the start address (B+X+D) is equal to the branch target address which is equal to the end address (B+X+D+0). Further, a compare between the start/branch target address (B+X+D) and the store content values of control register 10 (CR10) is saved.

Figure 2A:
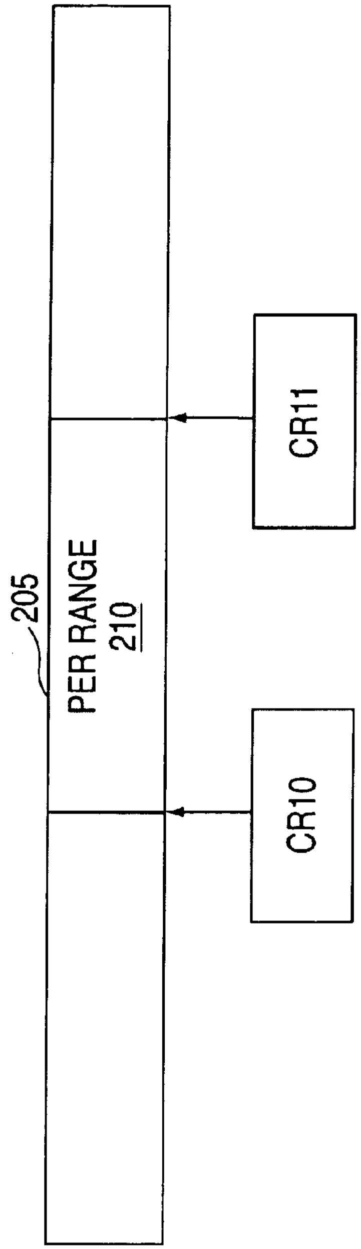
FIGS. 2A and 2B are diagrams respectively illustrating examples of a non-wrapped PER range and a wrapped PER range as defined in accordance within the exemplary embodiment of the present invention.
Figure 2B:
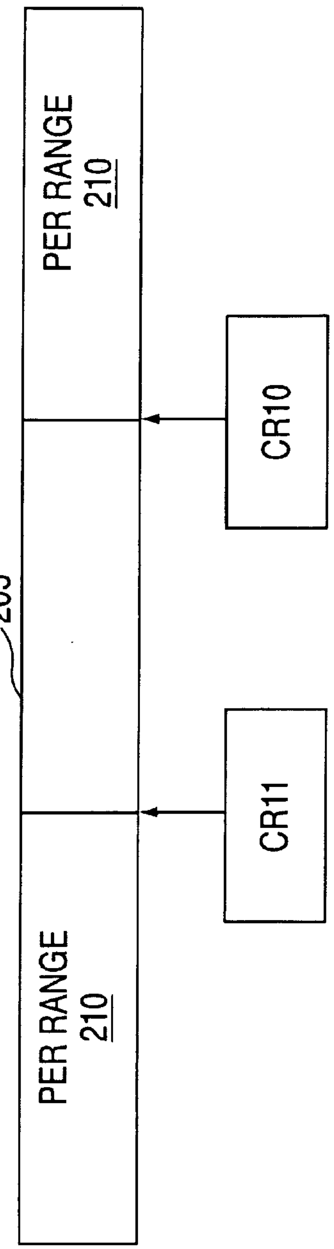

FIG. 1 further shows three comparators 125, 126, 127. Comparator 1 (125) is implemented in order to perform a comparison (CR10>CR11) between the store content values of CR10 and CR11 to determined if the PER range wraps around the designated storage area. An exemplary storage address space 205 is shown in FIGS. 2A and 2B. Also shown in FIGS. 2A and 2B are the control registers CR10 and CR11. The control registers CR10 and CR11 as respectively shown, store the starting address determined for the start of a designated storage area and the ending address that is determined for the end of the designated storage area. The designated storage area specified by the addresses stored at CR10 and CR11 further define the PER range 210, as exemplarily represented within FIGS. 2A and 2B. The PER range 210 as shown in FIG. 2A illustrates an example of an instance when the starting address as stored in CR10 precedes the ending address as stored within CR11. Conversely, FIG. 2B illustrates an example of an instance when the ending address as stored within CR11 precedes the starting address that is stored at CR10, thus resulting in the PER range 210 "wrapping" around the designated storage area.

A comparator 2 (126) is implemented in order to perform a comparison (start address≦CR11) between the start/branch target address (B+X+D) and the store content value of CR11. Comparator 3 (127) is implemented to perform a comparison (CR10≦end address) between the store content value of CR10 and the end address (B+X+D+L).

The output of the comparators are:

a. Per range wrap=1 if CR10 is greater than CR11.
b. start_addr_le_cr11=1 if start_addr (=branch target address for a branch instruction) is less than or equal to CR11.
c. end_addr_gt_cr10=1 if end_addr (=branch target address for a branch instruction) is greater than CR10.

And further, a PER branch event is detected—and qualified later when a branch is taken—in the instance of the following:

d. (per_range_wrap=0 AND (start_addr_le_cr11 AND end_addr_gt_cr10)), or
e. (per_range_wrap=1 AND (start_addr_le_cr11 OR end_addr_gt_cr10));

Within the exemplary embodiment three 64-bit comparators can be implemented in order to determine if a storage operand overlaps with the PER range. In a PER branch event an event occurs when the branch target is within PER range. For this operation two 64-bit comparators can be implemented to be in communication with control register 10 and control register 11; and may be required to determine whether a branch target is within the PER range. As mentioned above, in order to determine if a PER branch event has occurred, for a store of one byte of length, the starting address of a designated storage area will be equal to the ending address of the designated storage area. Thus, the starting address of a storage operand, the ending address of the storage operand, and the branch target can be calculated using two 3-way 64-bit adders.

Figure 3:
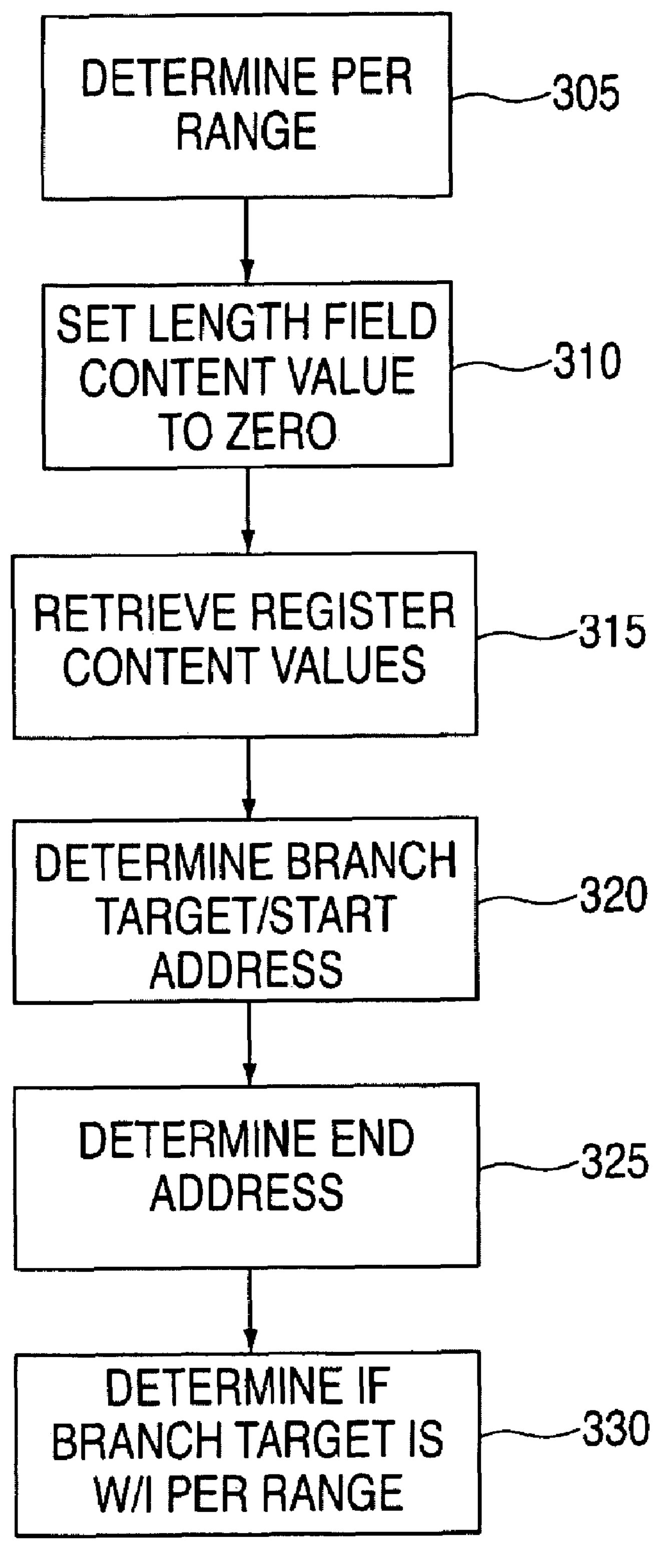
FIG. 3 is a flow diagram showing a method for performing PER branch and PER store operations within the same dataflow in accordance with the exemplary embodiment of the present invention.

FIG. 3 shows a flow diagram illustrating a method for performing PER branch operations within the same dataflow that is utilized for PER store operations. A PER range is determined at step 305, wherein the PER range as defined by the range of the storage content values of CR10 and CR11. At step 310, the length field value of the displacement and length register 108 is set to zero (0). Next, store content values are retrieved from the displacement 105, base 106, index 107, and displacement and length 108 registers (step 315). The displacement, index, and base store content values are delivered to a first adder 110 in order to ascertain a branch target/storage operand starting address (step 320). Further, the displacement and length, index, and base store content values are delivered to a second adder in order to determine a storage operand ending address (step 325). The branch target/storage operand starting address and the storage operand ending address are respectively delivered to the start address register 120 and the end address register 121, wherein since the length field value of the displacement and length register 108 has been set to zero the branch target/storage operand starting address is equal to the storage operand ending address. The contents of CR10, CR11, the start address register 120, and the end address register 121 are delivered to the plurality of comparators 125, 126, 127, and then at step 330 a determination is made to if the branch target address is within the PER range.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed:

1. A method for the unification of program event recording branch and store operations within the same dataflow, the method comprising:

determining a storage range, the storage range comprising a storage area defined by a designated storage starting area and a designated storage ending area, wherein the storage starting area is designated by a value of the contents of a first control register and the storage ending area is designated by a value of the contents of a second control register;

retrieving register field content values that are stored at a plurality of registers, wherein the retrieved content values comprises a length field content value; and setting the length field content value to zero for a branch instruction, thereby enabling a branch instruction to utilize the same hardware dataflow as a storage instruction.

2. The method of claim 1, further comprising delivering predetermined register field content values to a primary adder in order to determine a starting address for a storage operand or a branch target.

3. The method of claim 2, further comprising delivering predetermined register field values to a secondary adder in order to determine an ending address for a storage operand, wherein the predetermined register values comprises the length field content value.

4. The method of claim 3, further comprising delivering the contents of the primary adder to a start-address register and delivering the contents of the secondary adder to an end-address register.

5. The method of claim 4, further comprising delivering the contents of the first control register and the second control register to a first comparator, wherein the value of the contents of the first control register are compared to the value of the contents of the second control register in order to determine if the determined storage range wraps around the storage area.

6. The method of claim 5, further comprising delivering the contents of the start-address register and the second control register to a second comparator, the value of the contents of the start-address register are compared to the value of the contents of the second control register in accordance with a predetermined comparison rule.

7. The method of claim 6, further comprising delivering the contents of the end-address register and the first control register to a third comparator, wherein the value of the contents of the end-address register are compared to the value of the contents of the first control register in accordance with a predetermined comparison rule.

8. The method of claim 7, wherein a start-address register value is equal to an end-address value for a branch instruction.

9. The method of claim 8, wherein the start-address register value and the end-address register comprise a branch target address for a branch instruction.

10. The method of claim 9, further comprising determining if the target of the branch instruction is within the storage range in order to detect a branch event.

11. A computer program product that includes a computer readable storage medium useable by a processor, the medium having stored thereon a sequence of instructions which, when executed by the processor, causes the processor to unify program event recording branch and store operations within the same dataflow, by:

determining a storage range, wherein the storage range comprises a storage area defined by a designated storage starting area and a designated storage ending area, wherein the storage starting area is designated by a value of the contents of a first control register and the storage ending area is designated by a value of the contents of a second control register;

retrieving register field content values that are stored at a plurality of registers, wherein the retrieved content values comprise a length field content value;

setting the length field content value to zero for a branch instruction; and enabling a branch instruction to utilize the same hardware dataflow as a storage instruction, in response to setting the length field content value to zero.

12. The computer program product of claim 11, further comprising determining a starting address for a storage operand and a branch target from the predetermined register field content values.

13. The computer program product of claim 12, further comprising determining an ending address for a storage operand and branch target address from the predetermined register field content values, wherein the predetermined register field content values comprises the length field content value.

14. The computer program product of claim 13, wherein as a result of setting the length field content value to zero the storage operand starting address, storage operand ending address, and branch target address comprise equal values.

15. A system for the unification of program event recording branch and store operations within the same dataflow, the system comprising:

a plurality of registers, the registers being configured for the storage of a plurality of register field content values, the register field content values including a length field content value, the length field value being set to a value of zero for a branch instruction, and enabling a branch instruction to utilize the same hardware dataflow as a storage instruction, in response to setting the length field content value to zero;

a primary adder in communication with the plurality of registers, wherein the primary adder calculates a starting address or branch target address from predetermined register field content values that are retrieved from the plurality of registers; and a secondary adder in communication with the plurality of registers, wherein the secondary adder calculates an ending address from predetermined register field content values that are retrieved from the plurality of registers, the predetermined register field content values including the length field content value.

16. The system of claim 15, wherein as a result of setting the length field content value to zero the starting address, ending address, and branch target address comprise equal values.

* * * * *